US011246174B2

(12) United States Patent
Montemurro et al.

(10) Patent No.: US 11,246,174 B2
(45) Date of Patent: Feb. 8, 2022

(54) METHODS AND SYSTEMS FOR CONNECTING A WIRELESS DEVICE TO A WIRELESS NETWORK

(71) Applicant: BlackBerry Limited, Waterloo (CA)

(72) Inventors: Michael Peter Montemurro, Toronto (CA); Stephen McCann, Southampton (GB); James Randolph Winter Lepp, Ottawa (CA)

(73) Assignee: BlackBerry Limited, Waterloo (CA)

( * ) Notice: Subject to any disclaimer, the term of this patent is extended or adjusted under 35 U.S.C. 154(b) by 9 days.

(21) Appl. No.: 16/738,433

(22) Filed: Jan. 9, 2020

(65) Prior Publication Data

US 2021/0219353 A1 Jul. 15, 2021

(51) Int. Cl.
*H04W 76/10* (2018.01)
*H04W 12/06* (2021.01)
*H04W 48/16* (2009.01)

(52) U.S. Cl.
CPC ........... *H04W 76/10* (2018.02); *H04W 12/06* (2013.01); *H04W 48/16* (2013.01)

(58) Field of Classification Search
CPC ..... H04W 84/12; H04W 48/16; H04W 88/08; H04W 76/11; H04W 12/06; H04W 4/90; H04W 12/069; H04W 40/244; H04W 8/005; H04W 12/062; H04W 12/08; H04W 4/00; H04W 60/00; H04W 12/03; H04W 76/10
See application file for complete search history.

(56) References Cited

U.S. PATENT DOCUMENTS

| 10,893,554 | B1* | 1/2021 | Gandhi | ............... H04L 12/4641 |
| 2001/0048744 | A1* | 12/2001 | Kimura | ................... H04L 63/08 380/247 |
| 2006/0221919 | A1* | 10/2006 | McRae | ................ H04W 48/16 370/338 |
| 2007/0130456 | A1* | 6/2007 | Kuo | ...................... H04W 48/08 713/150 |
| 2010/0070771 | A1* | 3/2010 | Chen | ..................... H04L 9/3263 713/176 |

(Continued)

OTHER PUBLICATIONS

IEEE Std 802.11aq-2018 IEEE Standard for Information technology—Local and metropolitan area networks—Special requirements—Part 11: Wireless LAN MAC and PHY Specifications—Amendment 5: Preassociation Discovery, dated Aug. 31, 2018, p. 15-21 (Year: 2018).*

(Continued)

*Primary Examiner* — Daniel Lai
(74) *Attorney, Agent, or Firm* — Rowand LLP

(57) ABSTRACT

Methods and systems for connecting a wireless device to a wireless network. Configuration information is received by an access point of the wireless network including a service identifier corresponding to a service provided through the wireless device and a credential associated with the wireless device. The access point advertises the service identifier to the wireless device. The access point receives from the wireless device an association request including a network identifier corresponding to the wireless network. The access point authenticates the wireless device based on the service identifier and the credential.

32 Claims, 7 Drawing Sheets

(56) References Cited

U.S. PATENT DOCUMENTS

| | | | |
|---|---|---|---|
| 2012/0246468 A1* | 9/2012 | Gabor | H04W 12/069 |
| | | | 713/156 |
| 2015/0172876 A1* | 6/2015 | Mustajarvi | H04W 76/40 |
| | | | 455/404.1 |
| 2015/0208324 A1* | 7/2015 | McCann | H04W 48/08 |
| | | | 370/338 |
| 2016/0150412 A1 | 5/2016 | Liu et al. | |
| 2016/0323689 A1* | 11/2016 | Goluboff | H04W 12/069 |
| 2016/0323735 A1* | 11/2016 | Lumbatis | H04W 8/24 |
| 2017/0078408 A1 | 3/2017 | Lepp et al. | |
| 2018/0211198 A1* | 7/2018 | Makhoul | H04W 8/005 |

OTHER PUBLICATIONS

WiFi Alliance: "Wi-Fi Certified Easy Connect Technology Overview", dated Jun. 2018.
WiFi Alliance: "Device Provisioning Protocol Specification" Version 1.1, dated 2018.
EPO, Extended European Search Report relating to EP application No. 20211357.7, dated May 14, 2021.
Friel: "BRSK over IEEE 802 11; draft-friel-anima-brski-over-802dot11-00.txt", pp. 1-30, XP015129091,Oct. 18, 2018.
"Device Provisioning Protocol Specification Version 1.1", wi-fi Alliance, pp. 1-124, XP055787821, Dec. 3, 2018.
Melzer Jordan et al.: "Network Approaches to Improving Consumer IoT Security", pp. 1-6, XP033744496, Jan. 4, 2020.

* cited by examiner

METHODS AND SYSTEMS FOR CONNECTING A WIRELESS DEVICE TO A WIRELESS NETWORK

FIELD

The present application generally relates to wireless devices and, more particularly, to connecting wireless devices to wireless networks.

BACKGROUND

Internet of Things (IoT) devices may be used in homes and may be required to communicate with remote computing devices. Such an IoT device may be connected to a wireless local area network (WLAN) using a network name and passphrase. Sometimes the IoT device is installed and operated by a third party, such as an energy supplier.

The proper functioning of the IoT device can be important. Unfortunately, the connection between the IoT device and the remote computing devices has multiple points of potential failure. For example, the name or passphrase of the network may be changed. It would be difficult for the third party operator to reconnect the IoT device each time this occurs.

It would be advantageous to provide for enhanced reliability of the connection between an IoT device and a remote computing device.

BRIEF DESCRIPTION OF THE DRAWINGS

Reference will now be made, by way of example, to the accompanying drawings which show example embodiments of the present application, and in which.

Similar reference numerals may have been used in different figures to denote similar components.

DESCRIPTION OF EXAMPLE EMBODIMENTS

Figure 1:
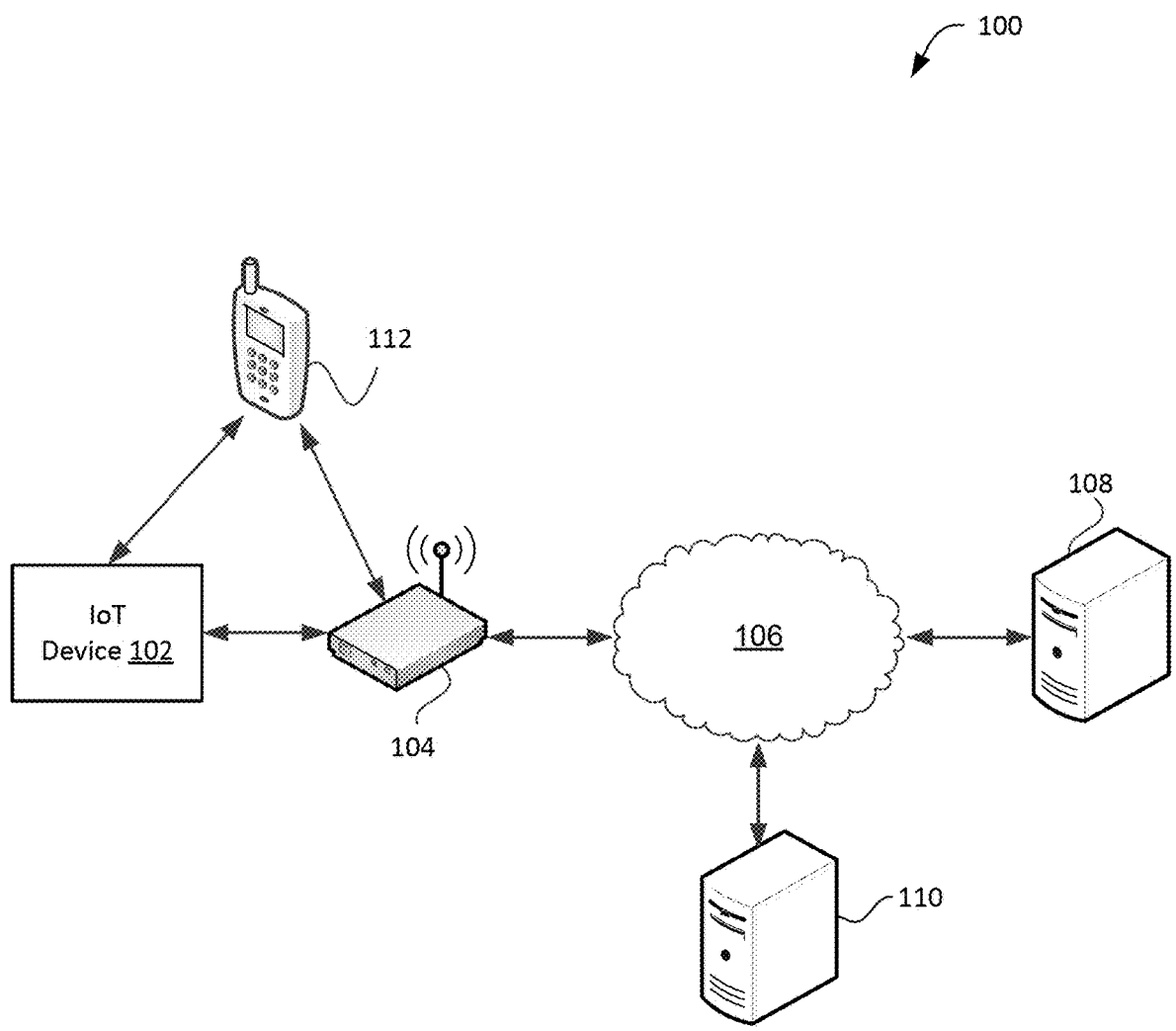
FIG. 1 shows a schematic diagram illustrating an operating environment of an example embodiment.

In a first aspect, the present application describes computer-implemented method of connecting a wireless device to a wireless network. The method may include receiving, by an access point of the wireless network, configuration information. The configuration information may include a service identifier corresponding to a service provided through the wireless device, and a credential associated with the wireless device. The method may further include advertising, by the access point to the wireless device, the service identifier; receiving, by the access point from the wireless device, an association request including a network identifier corresponding to the wireless network; and authenticating, by the access point, the wireless device based on the service identifier and the credential.

In some implementations, the service identifier is an attribute of the credential.

In some implementations, the credential is digitally signed.

In some implementations, advertising the service identifier includes advertising the service identifier in an unsigned format.

In some implementations, the service identifier is an immutable identifier.

In some implementations, the configuration information includes a policy identifier corresponding to both the service identifier and a network policy to apply to a communication of the wireless device.

In some implementations, the method may further include transmitting, by the access point to the wireless device, a wireless device credential useable by the wireless device to authenticate with the access point.

In some implementations, advertising the service identifier includes advertising the network identifier.

In some implementations, the method may further include transmitting, by the access point to the wireless device prior to advertising the service identifier, the service identifier usable by the wireless device to match with the subsequently advertised service identifier.

In some implementations, transmitting the service identifier is performed as part of a device provisioning protocol and advertising the service identifier is performed as part of a pre-association discovery procedure.

In another aspect, there may be provided a system for connecting a wireless device to a wireless network. The system may include an access point including a processor and a memory coupled to the processor of the access point and storing processor-readable instructions that, when executed, cause the processor of the access point to: receive, by the access point, configuration information including a service identifier corresponding to a service provided through a wireless device, and a credential associated with the wireless device; advertise, by the access point to the wireless device, the service identifier; receive, by the access point from the wireless device, an association request including a network identifier corresponding to a wireless network associated with the access point; and authenticate, by the access point, the wireless device based on the service identifier and the credential.

In some implementations, the service identifier is an attribute of the credential.

In some implementations, the credential is digitally signed.

In some implementations, advertising the service identifier includes advertising the service identifier in an unsigned format.

In some implementations, the service identifier is an immutable identifier.

In some implementations, the configuration information includes a policy identifier corresponding to both the service identifier and a network policy to apply to a communication of the wireless device.

In some implementations, the processor may be further configured to transmit, by the access point to the wireless device, a wireless device credential useable by the wireless device to authenticate with the access point.

In some implementations, advertising the service identifier includes advertising the network identifier.

In some implementations, the processor may be further configured to transmit, by the access point to the wireless device prior to advertising the service identifier, the service identifier usable by the wireless device to match with the subsequently advertised service identifier.

In yet a further aspect, the present application describes a non-transitory computer-readable storage medium storing processor-readable instructions that, when executed, configure a processor to perform any of the methods described herein. Also described in the present application is a computing device comprising: a processor, memory, and an application containing processor-executable instructions that, when executed, cause the processor to carry out at least one of the methods described herein. In this respect, the term processor is intended to include all types of processing circuits or chips capable of executing program instructions.

Other aspects and features of the present application will be understood by those of ordinary skill in the art from a review of the following description of examples in conjunction with the accompanying figures.

In the present application, the terms "about", "approximately", and "substantially" are meant to cover variations that may exist in the upper and lower limits of the ranges of values, such as variations in properties, parameters, and dimensions. In a non-limiting example, the terms "about", "approximately", and "substantially" may mean plus or minus 10 percent or less.

In the present application, the term "and/or" is intended to cover all possible combinations and sub-combinations of the listed elements, including any one of the listed elements alone, any sub-combination, or all of the elements, and without necessarily excluding additional elements.

In the present application, the phrase "at least one of . . . or . . . " is intended to cover any one or more of the listed elements, including any one of the listed elements alone, any sub-combination, or all of the elements, without necessarily excluding any additional elements, and without necessarily requiring all of the elements.

In the present application, the term "provisioning" is intended to cover providing a wireless device and/or access point with specific information to allow the wireless device to establish connectivity with a WLAN so that the wireless device can perform communications through the WLAN with another endpoint. In some examples, the specific information that is provided to the wireless device and/or access point as part of the provisioning process includes a credential.

Reference will now be made to FIG. 1, which diagrammatically illustrates an example system 100 for connecting a wireless IoT device to a wireless network. The system 100 in this example includes a wireless IoT device 102.

The IoT device 102 is, or includes, one or more computing devices and may take one of any number of forms, such as an appliance (e.g., water heater, water filtration system, refrigerator, and television), sensor (e.g., temperature sensor, humidity sensor, light sensor, pressure sensor, fire detector and door bell), actuator (e.g. street light and room temperature controller), wearable computing device (e.g., watch, jewelry, and glasses) or any other electronic device that may be configured to establish a connection over a wireless network, store data and software instructions, and execute software instructions to perform operations consistent with disclosed embodiments. In some embodiments, the IoT device 102 is a "headless" device, which is intended to include devices that have no user interface. In some embodiments, the IoT device 102 is referred to as a "headed" device, which is intended to include devices that have a user interface.

The system 100 also includes a wireless access point 104, or more simply, an access point (AP). The access point 104 is, or includes, one or more computing devices and may be, as illustrated, a residential gateway device. In some embodiments, the access point is referred to as customer-premises equipment or customer-provided equipment (CPE). In another embodiment, the access point is a small cellular base station forming a picocell.

The access point 104 provides access to a wireless network, such as, for example, a WLAN (not shown). Although reference is made to a WLAN in some examples, it will be appreciated that in some embodiments other types of wireless networks may be implemented. One example of a wireless network is a cellular network. Another example of a wireless network is a close proximity (i.e. personal area) wireless network, sometimes referred to as a wireless personal area network (WPAN). Examples of WPANs include Bluetooth® and Zigbee®. The range of a WPAN may be between a few centimeters and a few meters.

The access point 104 is connected to a network 106, which may include the Internet. The network 106 allows for communication between the IoT device 102 and a remote computing device 108.

The remote computing device 108 may be configured to ingest data from the IoT device 102. In particular, the IoT device 102 may transmit alerts, notifications, telemetry or other data to the remote computing device 108 for storage, processing and/or monitoring of the IoT device 102 by the remote computing device 108. The remote computing device 108 may also be configured to manage and/or control the IoT device 102. For example, the remote computing device 108 may communicate commands or notifications to the IoT device 102. In some embodiments, the remote computing device 108 may include multiple computing devices such as, for example, email servers, web servers, database servers, social networking servers, file transfer protocol (FTP) servers, and the like. More generally, the remote computing device 108 may include infrastructure that controls the IoT device 102 and/or collects data from the IoT device 102, such as, for example, the IoT device 102 manufacturer's or vendor's data centers.

The system 100 also includes a policy server 110. The policy server 110 may be configured to store a network policy associated with a service associated with the IoT device 102. In some embodiments, the policy server 110 may be a web server that hosts policy files. The access point 104 may request and receive policy files from the policy server 110.

The system 100 also includes a wireless configuration device 112 for wirelessly provisioning the IoT device 102 and the access point 104. The configuration device 112 may be, as illustrated, a smartphone.

The IoT device 102 and the configuration device 112 are located within the wireless range of the access point 104 and may be configured to communicate and establish a wireless connection with the access point 104. Although only a single IoT device 102 is illustrated in FIG. 1, it is understood that multiple IoT devices 102 may connect to the access point 104.

Any of the remote computing device 108, policy server 110, and configuration device 112 may be managed, operated or controlled by the same entity, such as, for example, the manufacturer of the IoT device 102, a component provider of the IoT device, a systems integrator or a mobile network operator (MNO).

Figure 2:
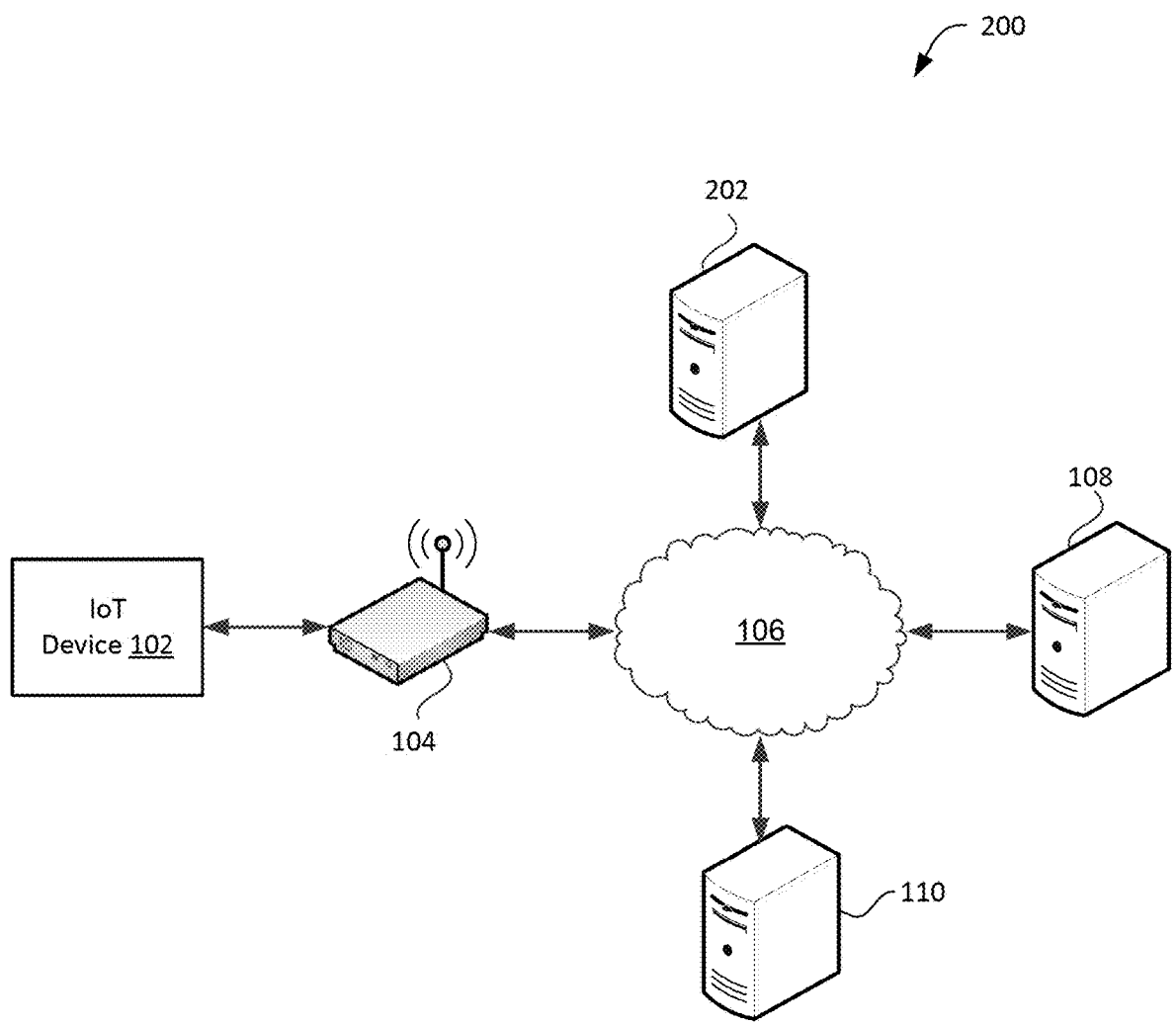
FIG. 2 shows a schematic diagram illustrating an operating environment of another example embodiment.

Reference will now be made to FIG. 2, which diagrammatically illustrates another example system 200 for connecting a wireless IoT device to a wireless network. The system 200 in this example includes a remote management device 202 for provisioning the access point 104.

The remote management device 202 may be configured to communicate with and provision the access point 104. Furthermore, the access point 104 may be configured to provision the IoT device 102. In some embodiments, the remote management device 202 is managed, operated or controlled by an entity, sometimes referred to as a telecommunications service provider (TSP), that is responsible for providing the access point 104 with access to the network 106.

The remote computing device 108, policy server 110, configuration device 112 and remote management device 202 may be, or include, one or more computing devices. In some embodiments, each may be, or may include, a device of another type such as, for example, a personal computer, a laptop computer, a tablet computer, a notebook computer, a hand-held computer, a personal digital assistant, a wearable computing device or any other type of computing device that may be configured to store data and software instructions, and execute software instructions to perform operations consistent with disclosed embodiments.

The IoT device 102, access point 104 and configuration device 112 may be in a geographically disparate location from the remote computing device 108, policy server 110, configuration device 112 and remote management device 202. In particular, the remote computing device 108, policy server 110, configuration device 112 and remote management device 202 may be outside of the wireless range of the IoT device 102, access point 104 and configuration device 112.

Figure 3:
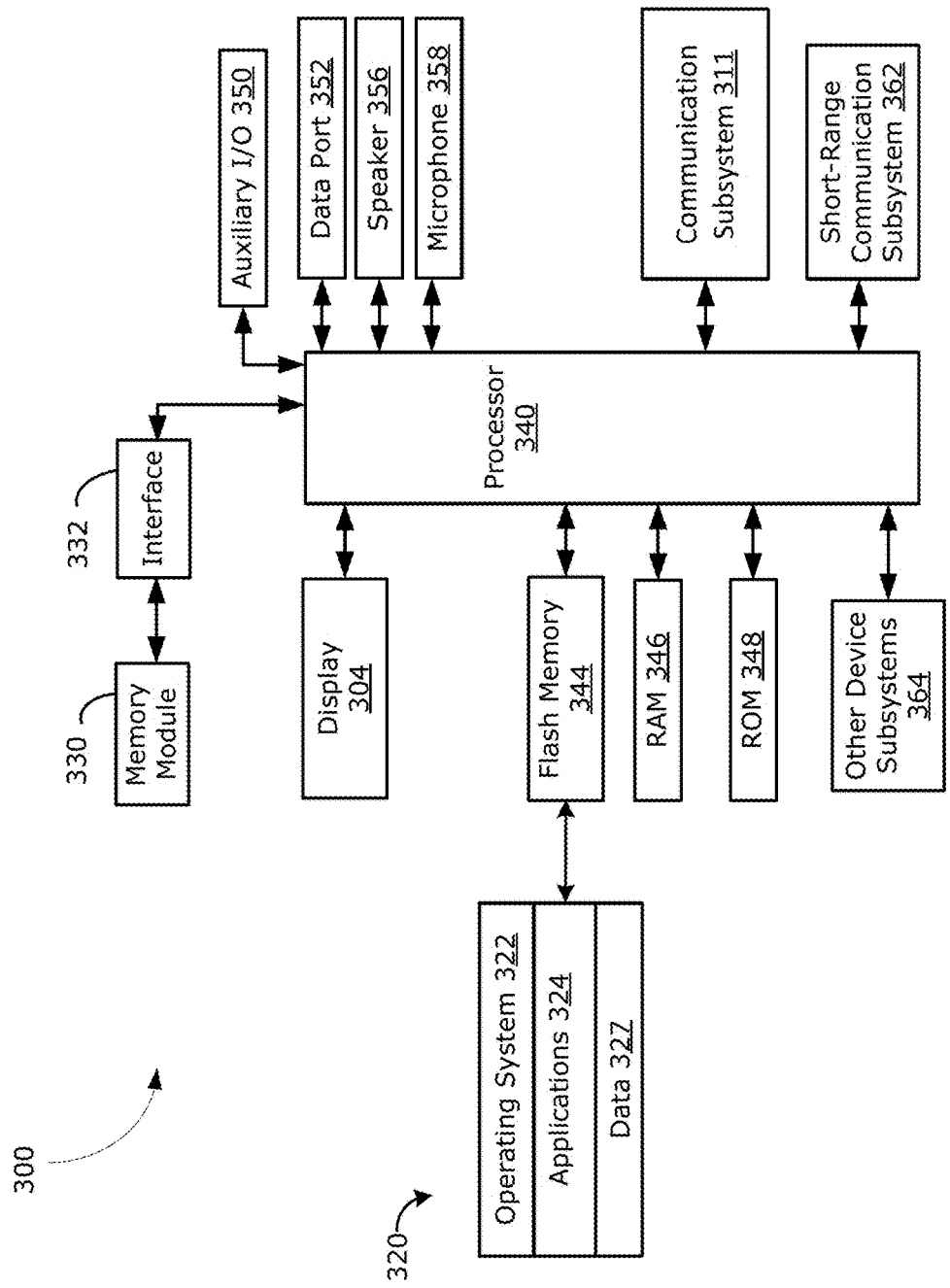
FIG. 3 is a block diagram illustrating components of example embodiments of the computing devices of FIGS. 1 and 2.

Reference is made to FIG. 3, which illustrates a block diagram of an example embodiment of each of the computing devices of FIGS. 1 and 2, namely the IoT device 102, access point 104, remote computing device 108, policy server 110, wireless configuration device 112 and remote management device 202. The computing device 300 may be configured for two-way communication, having data and optionally voice communication capabilities, and the capability to communicate with other computer systems, e.g. via the internet.

The computing device 300 of FIG. 3 may include a housing (not shown) which houses components of the computing device 300. Internal components of the computing device 300 may be constructed on a printed circuit board (PCB). The computing device 300 includes a controller including at least one processor 340 (such as a microprocessor) which controls the overall operation of the computing device 300. The processor 340 interacts with device subsystems, such as a wireless communication subsystem 311, for exchanging radio frequency signals with a wireless network to perform communication functions. The processor 340 interacts with additional device subsystems including one or more input interfaces (which may include, without limitation, any of the following: a keyboard, one or more control buttons, one or more microphones 358, a gesture sensor, and/or a touch-sensitive overlay associated with a touchscreen display), flash memory 344, random access memory (RAM) 346, read only memory (ROM) 348, auxiliary input/output (I/O) subsystems 350, a data port 352 (which may be a serial data port, such as a Universal Serial Bus (USB) data port), one or more output interfaces (such as a display 304), one or more speakers 356, or other output interfaces), a short-range communication subsystem 362, and other device subsystems generally designated as 364.

In some example embodiments, the auxiliary input/output (I/O) subsystems 350 may include an external communication link or interface, for example, an Ethernet connection. The communication subsystem 311 may include other wireless communication interfaces for communicating with other types of wireless networks, e.g. Cellular, WLAN, WPAN, Bluetooth®, ZigBee®, Near Field Communications (NFC), and Radio Frequency Identification (RFID).

In some example embodiments, the computing device 300 also includes a removable memory module 330 (typically including flash memory) and a memory module interface 332. Network access may be associated with a subscriber or user of the computing device 300 via the memory module 330, which may be a Subscriber Identity Module (SIM) card for use in a cellular network (e.g., Global System for Mobile Communications (GSM), Universal Mobile Telecommunications Service (UMTS), Long-Term Evolution (LTE) or 5G) or other type of memory module for use in the relevant wireless network type. The memory module 330 may be inserted in or connected to the memory module interface 332 of the computing device 300.

The computing device 300 may store data 327 in an erasable persistent memory, which in one example embodiment is the flash memory 344. In some example embodiments, the data 327 may include service data having information required by the computing device 300 to establish and maintain communication with a wireless network. The data 327 may also include user application data such as messages (e.g. emails, texts, multimedia messages, etc.), address book and contact information, calendar and schedule information, notepad documents, image files, and other commonly stored user information stored on the computing device 300 by its users, and other data.

The data 327 stored in the persistent memory (e.g. flash memory 344) of the computing device 300 may be organized, at least partially, into a number of databases or data stores each containing data items of the same data type or associated with the same application. For example, identifiers may be stored in individual files within the computing device 300 memory.

The short-range communication subsystem 362 provides for communication between the computing device 300 and different systems or devices, which need not necessarily be similar devices. For example, the short-range communication subsystem 362 may include an infrared device and associated circuits and components, a wireless bus protocol compliant communication mechanism such as a Bluetooth® communication module to provide for communication with similarly-enabled systems and devices, and/or a near-field communication (NFC) interface.

A set of applications that control basic device operations, including data and possibly voice communication applications, may be installed on the computing device 300 during or after manufacture. Additional applications and/or upgrades to an operating system 322 or software applications 324 may also be loaded onto the computing device 300 through the wireless network, the auxiliary I/O subsystem 350, the data port 352, the short-range communication subsystem 362, or other suitable device subsystems 364. The downloaded programs or code modules may be permanently installed; for example, written into the program memory (e.g. the flash memory 344), or written into and executed from the RAM 346 for execution by the processor 340 at runtime.

The processor 340 operates under stored program control and executes software modules 320 stored in memory such as persistent memory, e.g. in the flash memory 344. As illustrated in FIG. 3, the software modules 320 may include operating system software 322 and one or more applications 324 (or modules). Specific examples of applications that may be resident on the computing device 300 include an email messaging application, a database application, or an Internet browser application.

The operating system software 322 may provide a file system for storing, modifying and accessing files held in the persistent memory (e.g. flash memory 344) of the computing device 300. This file system may be accessible to other programs running on the processor 340 via a programmatic interface provided by the operating system software 322.

Figure 4:
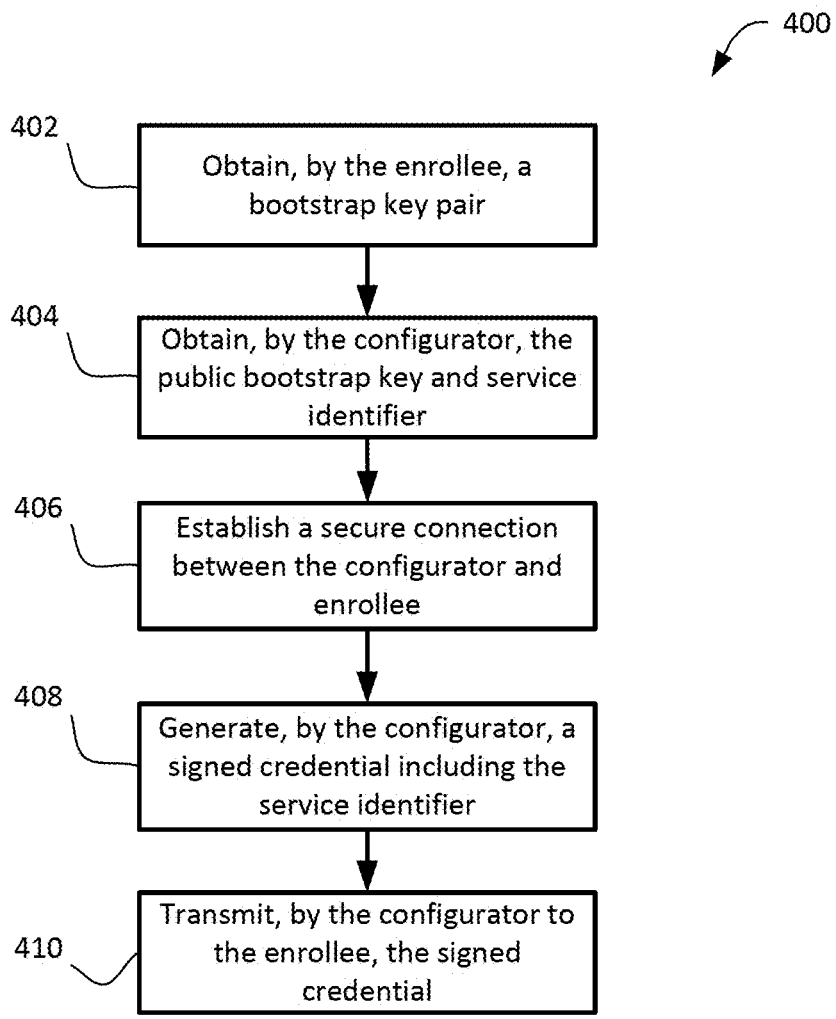
FIG. 4 shows a flowchart of a simplified example method of provisioning a wireless device.

Reference is now made to FIG. 4, which shows one example method 400 of provisioning the wireless device with a credential for authentication with the access point. At least some of the operations may be carried out by the wireless device 102 and the wireless configuration device 112 in the example system 100 illustrated in FIG. 1. In this example, the wireless device 102 may be referred to as the provisioned device or simply as an enrollee. The wireless configuration device 112 may be referred to as a provisioning device or simply as a configurator.

Aspects of the method 400 may be implemented using a device provisioning protocol. An example device provisioning protocol is the Device Provisioning Protocol (DPP) from the entity operating under the trade name WI-FI ALLIANCE™.

In operation 402, the enrollee receives a public-private bootstrapping key pair. The key pair may be stored in the enrollee's memory at the time of manufacture and subsequently obtained by the enrollee from the memory. The public bootstrapping key is sometimes referred to as the enrollee's bootstrapping key. The enrollee may be identified by the bootstrapping key.

In operation 404, the configurator obtains the bootstrapping key corresponding to the enrollee. The bootstrapping key may be obtained by the configurator in any number of ways.

In some embodiments, the configurator obtains the bootstrapping key using an out-of-band (OOB) mechanism, which may refer to a communication mechanism other than the WLAN. OOB mechanisms may involve receiving input via a scan of a quick response code (QR code), a near-field communication (NFC) tap, a Bluetooth® Low Energy (BLE) exchange. In one example, the bootstrapping key is stored in a QR code sticker located on the enrollee. The configurator may scan the QR code to obtain the bootstrapping key. In another example, the bootstrapping key is obtained from the enrollee through a BLE exchange or an NFC tap.

In some embodiments, the configurator obtains the bootstrapping key from a server that is remote from the configurator. In one embodiment, an entity holds an account with an IoT device provider, such as, for example, an energy supplier. The IoT device provider may provide the entity with the wireless device, such as a smart water heater that measures energy usage, and a downloadable application configured to communicate with a remote server operated by the IoT device provider. The application may be installed on the configurator. The application may obtain and transmit account information for the account holder to the remote server. In response, the remote server may return a bootstrapping key that is linked to the account holder's account.

In operation 404, the configurator also obtains the service identifier. The service identifier may be obtained by the configurator in any number of ways, including any of the ways in which the bootstrap key may be obtained.

In operation 406, the configurator establishes a secure wireless connection with the enrollee. In some embodiments, the configurator searches for the enrollee by broadcasting an authentication request that includes a hash of the bootstrapping key. The enrollee listens for and receives the authentication request message. The enrollee authenticates the configurator by determining that a hash of the bootstrapping key is included in the authentication request message. After validating the authentication request, the enrollee generates a public-private connection key pair and transmits the public connection key to the configurator. A secure connection may be established using the public connection key and methods known in the art. For example, in some embodiments, the DPP Authentication Protocol is used to generate the public-private connection key pair and establish the secure connection.

After establishing a secure connection, in operation 408, the configurator may generate a credential for distribution to the wireless device. The credential may include one or more attributes for use by the wireless device to authenticate with the access point and gain connectivity to WLAN. In particular, the attributes may contain information on the identity and authorization capability of the subject of the credential. In some embodiments, a credential attribute may be a property of the wireless device. For example, a service identifier of the wireless device may be an attribute of the credential.

The credential may be signed by the configurator. In particular, the configurator may generate a private-public signing pair and sign the credential using the private signing key. A verifier, such as, for example, the access point, may obtain and use the corresponding public signing key in order to establish that the credential has been signed by the configurator.

In some embodiments, the credential may be in a JavaScript Object Notation (JSON) format. Among the objects that may be included in the credential object is a connector object, which may be an example of a credential signed by the configurator. The connector object may include various attributes, referred to as connector attributes. Examples of connector attributes that may be stored within the connector include the enrollee's public connection key and/or the service identifier. The connector attributes may be examples of credential attributes.

In this example, the private signing key may be used to digitally sign and encode the connector object as a JSON Web Signature (JWS) compact serialization according to RFC 7515. The signing algorithm may be performed using, for example, any suitable JSON Web Algorithm (JWA) algorithm according to RFC 7518. The corresponding public signing key may also be included as an attribute of the credential object for later use by a verifier.

In operation 410, the configurator transmits the credential to the enrollee in a configuration response message. The enrollee receives the credential and may store it in its memory. In this example, the credential may be referred to as the wireless device credential. Since the public connection key is included in the credential, the credential should be unique to the wireless device.

Figure 5:
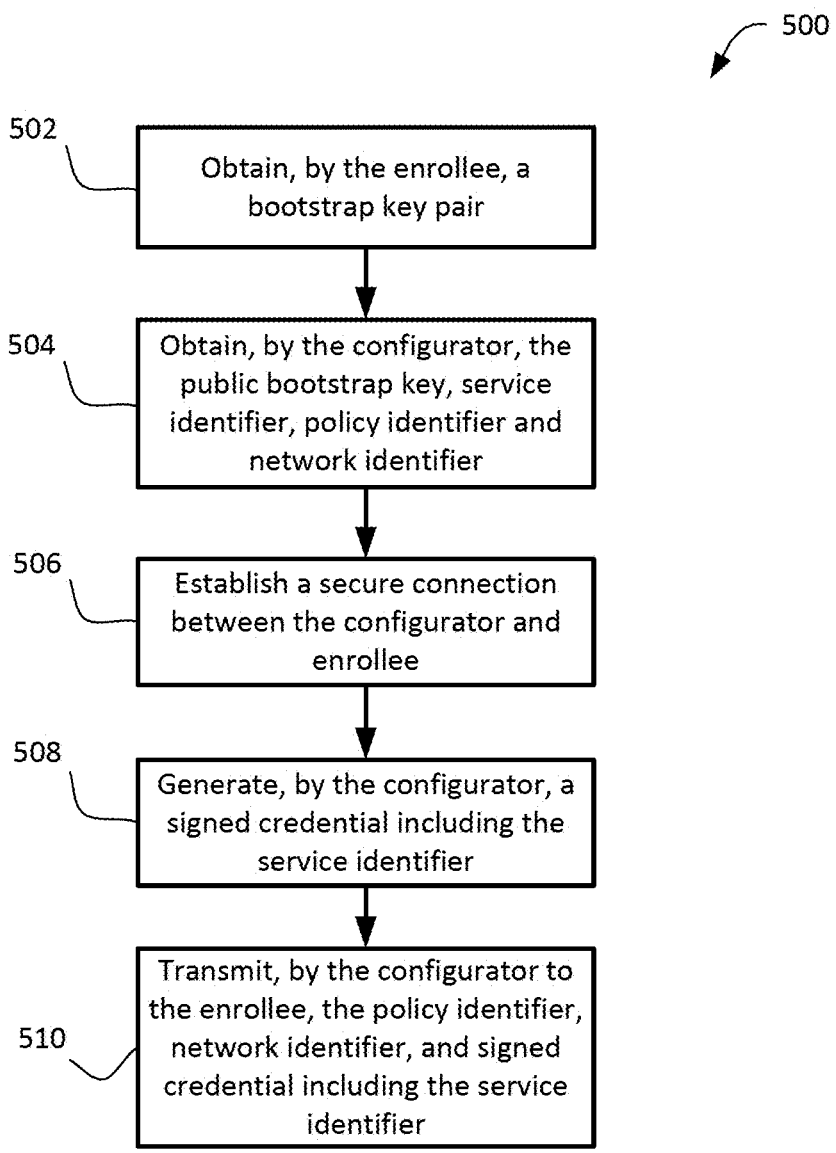
FIG. 5 shows a flowchart of a simplified example method of provisioning an access point.

Reference is now made to FIG. 5, which shows one example method 500 of provisioning the access point. It will be appreciated that the method 500 may be implemented by varying the method 400 as described in FIG. 4 to provision the access point instead of the wireless device. At least some of the operations may be carried out by the access point 104 and the wireless configuration device 112 in the example system 100 illustrated in FIG. 1, which may act as the enrollee and configurator, respectively.

In operation 502, the enrollee may receive a public-private bootstrapping key pair corresponding to the enrollee.

In operation 504, the configurator may obtain the bootstrapping key corresponding to the enrollee.

In operation 504, the configurator may also obtain the wireless device's service identifier as described in the method 400 illustrated in FIG. 4. In the case where the configurator has already provisioned the wireless device, the configurator may obtain the service identifier from the memory of the configurator.

In operation 504, the configurator may also obtain a policy identifier associated with the wireless device. The policy identifier may be obtained by the configurator in any number of ways, including any of the ways in which the wireless device's service identifier may be obtained. For example, the configurator may scan a QR code located on the wireless device to obtain both the service identifier and the policy identifier.

In operation 504, the configurator may also obtain a network identifier corresponding to the particular WLAN the wireless device should connect to. In some embodiments, the access point may be configurable to support multiple WLANs. In this example, the configurator may receive input indicating a new network identifier for a new WLAN that should be created on the access point. In some embodiments, the configurator may display a list of network identifiers of existing WLANs that are in wireless range of the configurator and/or are associated with the access point. The configurator may receive input indicating the selection of a particular network identifier from the list.

In operation 506, the configurator establishes a secure wireless connection with the enrollee as described in the method 400 illustrated in FIG. 4. In particular, the configurator may broadcast the access point's bootstrapping key and the access point may generate and transmit a public connection key to the configurator.

After establishing a secure connection, in operation 508, the configurator may generate a credential for distribution to the access point. The service identifier and the access point's public connection key may be attributes of the credential. The credential may be signed by the configuration using the same private signing key that is used to sign the wireless device's credential. The corresponding public signing key may be included in the credential.

In operation 510, the configurator transmits the credential, the policy identifier and the network identifier to the access point. The enrollee receives this configuration information and may store it in its memory. In this example, the credential may be referred to as the access point credential.

Figure 6:
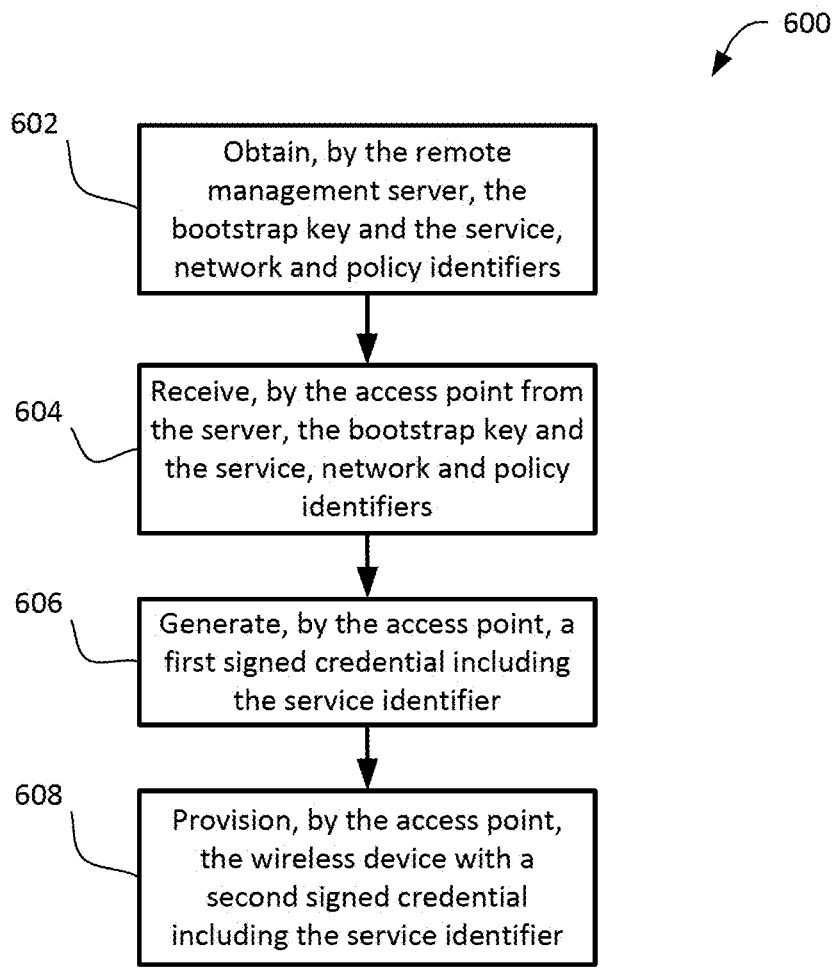
FIG. 6 shows a flowchart of another simplified example method of provisioning an access point and a wireless device.

Reference is now made to FIG. 6, which shows an example method 600 of provisioning an access point and wireless device according to another embodiment. In this example, the access point is provisioned by a remote management server. At least some of the operations may be carried out by the remote management device 202, the access point 104 and the wireless device 102 in the example system 200 illustrated in FIG. 2.

This example method of provisioning may be particularly suitable in embodiments where a TSP has permission to configure the access point and an IoT device provider has a relationship with the TSP. In one example, an entity has a first account with a TSP and a second account with an energy supplier or other IoT device provider. The first and second accounts may be associated with the access point and the wireless device, respectively. The TSP provides the entity with the access point and the energy provider provides the entity with the wireless device, such as a smart water heater that measures energy usage. The TSP receives permission from the entity to configure the access point to connect with the wireless device. A server operated by the energy supplier communicates account information and configuration information to a server operated by the TSP. The account information identifies the entity and may include the entity's name and street address. The configuration information includes information that supports connectivity of the wireless device to the WLAN. In particular, the configuration information may include the service identifier for discovery of the access point by the wireless device, policy identifier, network identifier and bootstrap key corresponding to the wireless device. The communication between the servers may occur using any suitable electronic communications means, including email, fax, Cellular, WLAN, WPAN, Bluetooth®, ZigBee®, NFC, RFID, JSON Web Tokens or OAUTH. The server operated by the TSP may match the received account information with the first account and then link the received configuration information to the first account and/or the access point. The server may be the remote management server and the received configuration information may be stored on the remote management server. More generally, in operation 602, the remote management server may obtain the service identifier, policy identifier, network identifier and the wireless device's bootstrap key.

In operation 604, the remote management server transmits the service identifier and the wireless device's bootstrap key to the access point. The transmission may be carried out as part of an application layer management protocol that uses a defined data model. An example management protocol is the TR-069 protocol and an example data model is the TR-181 device data model.

In operation 606, the access point generates a first signed credential that includes the service identifier. The first signed credential may be generated as described in the operation 508 of the method 500 illustrated in FIG. 5.

In operation 608, the access point may provision the wireless device with a second signed credential using the method 400 as described in FIG. 4. In this example, the access point may act as the configurator and the wireless device as the enrollee.

Figure 7:
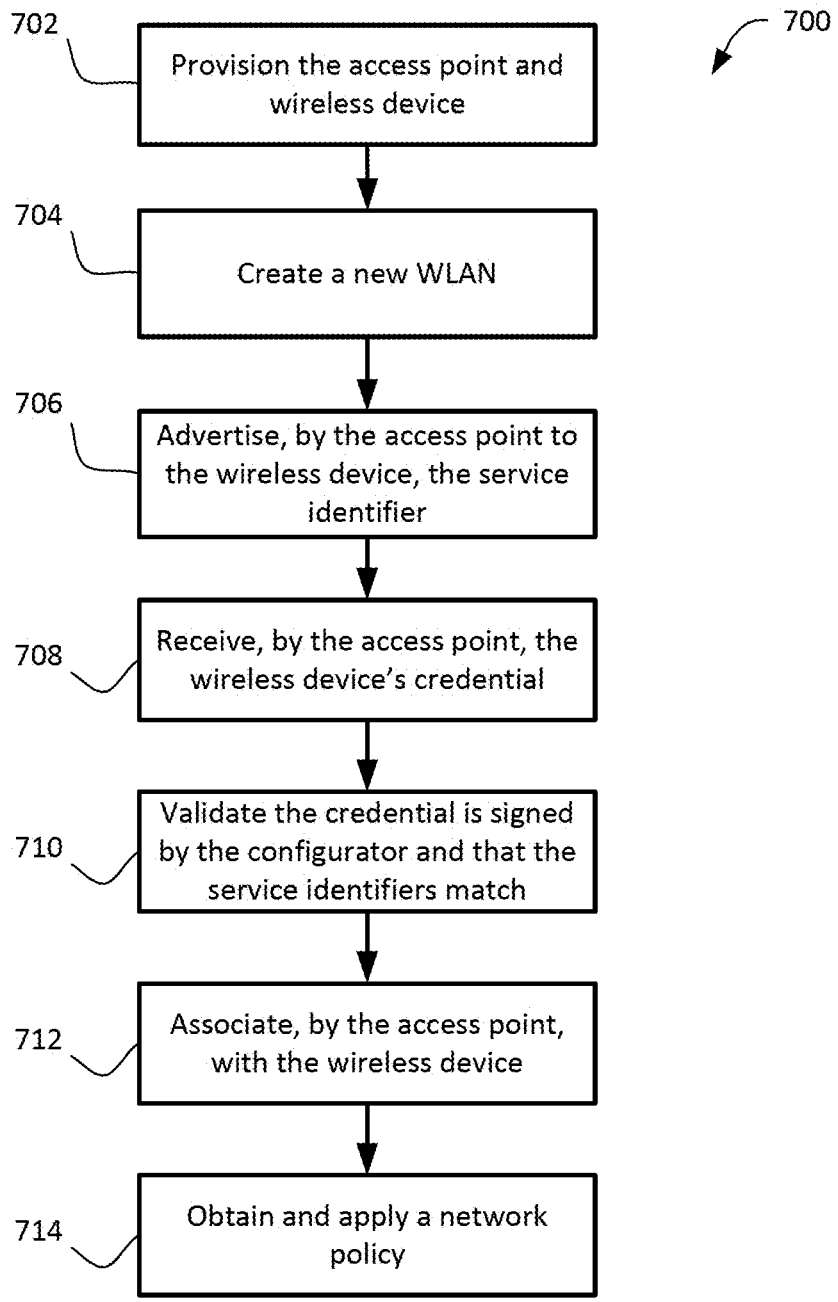
FIG. 7 shows a flowchart of a simplified example method of connecting a wireless device to a WLAN.

Reference is now made to FIG. 7, which shows one example method of connecting a wireless device to a WLAN. At least some of the operations may be performed or carried out by the computing devices of FIG. 1 or 2. Aspects of the method 700 may be implemented using the Institute of Electronics and Electrical Engineers (IEEE) 802.11 standard, which specifies media access control (MAC) and physical layer (PHY) protocols for implementing WLAN communications. Although reference is made to the IEEE 802.11 protocol in some examples, it is noted that communications in a wireless network with access points may operate according to other protocols in other examples.

The method 700 includes, in operation 702, provisioning the wireless device and access point. The access point and wireless device may be provisioned in any number of ways, including through the example methods 400, 500 and 600 described in FIGS. 4, 5 and 6.

In some examples, the access point is provisioned with a network identifier that corresponds to an existing WLAN of the access point. In operation 704, if the access point is provisioned with a new network identifier that does not correspond to a WLAN associated with the access point, then the access point may create a new WLAN corresponding to the new network identifier. In particular, the access point may generate a unique basic service set identifier (BSSID) that corresponds to the network identifier. In general, the BSSIDs of the access point may correspond to respective network identifiers. In some embodiments, the BSSID is derived from a MAC address of the access point. The MAC address may be a unique identifier assigned to a network interface controller of the access point. Accordingly, each access point of the WLAN may have a different and unique BSSID that is associated with the WLAN.

The access point may link the WLAN to at least some of the provisioned configuration information, such as, for example, the service identifier, credential, and network policy. In particular, the network identifier and/or the BSSID of the WLAN may be linked to at least some of the provisioned configuration information.

In operation 704, the wireless device searches for and discovers the WLAN that supports the service provided through the wireless device. The discovery operation involves matching the service identifier provisioned to the wireless device with the service identifier provisioned to the access point. Any suitable discovery techniques may be employed. For example, the IEEE 802.11 standard describes two types of pre-association discovery (PAD) procedures, unsolicited and solicited.

In this example, the service identifier may be transmitted between the access point and wireless device in MAC beacon and probe frames specified by the IEEE 802.11 standard. In particular, the service identifier may be transmitted in an unsigned format and in the form of a hash value referred to as a "service hash". The access point and the wireless device may obtain the service hash by applying a hash function to the service identifier.

In an unsolicited PAD method, the access point may advertise the WLAN to the wireless device by broadcasting a beacon frame. The beacon frame may include the WLAN's network identifier and the linked service identifier. The wireless device may receive the beacon frame and determine that the advertised service identifier matches the service identifier provisioned to the wireless device.

In a solicited PAD method, the wireless device may send a service discovery probe request to the access point requesting an advertisement from the access point. The probe request may include the service identifier. The access point may receive the probe request and compare the received service identifier to the service identifiers provisioned to the access point. If a match is found, the access point may advertise the WLAN that is linked to the service identifier by transmitting a probe response to the wireless device. The probe response may include the WLAN's network identifier and the linked service identifier. In some embodiments, the request is an Access Network Query Protocol (ANQP) Service Information Request. ANQP supports information retrieval from an advertisement server that supports a Generic Advertisement Service ("GAS"). ANQP and GAS are described in the IEEE 802.11 standard. The access point may respond to the ANQP Service Information Request with an ANQP Service Information Response that includes the WLAN's network identifier and the service identifier.

In other examples, other techniques of advertising service information to wireless devices may be employed.

The access point may be provisioned with one or more service identifiers that correspond to respective services that are provided through wireless devices. The service identifier may be any of a number of different types. The service identifier may be, for example, a hash, a Network Access Identifier (NAI) realm or an organizationally unique identifier (OUI), sometimes referred to as an organization identifier (OD. The NAI may be in the format defined in the RFC 4282 standard. The OUI may be a globally unique 24-bit identifier of an organization. OUI is an IEEE Registration Authority term that is referred to in various standards and may be used to identify a company. The different types of service identifiers may allow for wireless devices with different discovery capabilities to be supported.

The service identifier that is provisioned to the access point may have a fixed value and may not be modified, editable, customized or change over time. In some embodiments, the service identifier may be referred to as a static, immutable, or permanent identifier.

The wireless device may be provisioned with a set of one or more service identifiers. The one or more service identifiers may be an attribute of the wireless device credential. In one example, the provisioned set of service identifiers includes the example NIA realms "waterheater@regionAenergysupplier.com" and "waterheater@regionBenergysupplier.com" associated with two different organizations and an OUI for a third entity. The service identifiers may correspond to wireless device vendors and/or service providers. One of the service identifiers in the set may correspond to an account associated with the wireless device and the access point may be provisioned with that service identifier. The wireless device may use the set of service identifiers to search for a WLAN that advertises a service identifier that matches one of the service identifiers in the set.

After the wireless device discovers the WLAN that advertises the service identifier, the wireless device authenticates with the access point. The authentication is based on the provisioned credentials and service identifiers. In operation 708, the access point receives, from the wireless device, a message including the wireless device's credential and the discovered network identifier.

In operation 710, the access point validates that the wireless device credential is signed by the configurator. In particular, the access point compares the wireless device credential to the access point credential. The access point verifies the wireless device's signature using the credential's public signing key and also determines that a match exists between the wireless device credential's signing key and the access point credential's signing key. If the signature is verified and a match is found, the access point may safely assume that the credential was issued by the configurator and is unforged, since only the configurator, that is, the holder of the private signing key, can issue credentials that will verify under the public signing key.

The access point also compares the service identifier of the access point credential to the service identifier of the wireless device credential to determine that the service identifiers match.

In some embodiments, the access point may have one or more access point credentials corresponding to one or more respective wireless devices. In this case, the access point may compare the access point credentials linked to the WLAN with the wireless device credential until a match, if any exists, is found.

If the access point finds a match, the access point sends the matching access point credential to the wireless device.

The wireless device validates that the access point credential is signed by the configurator. In particular, the access point verifies the wireless device's signature using the credential's public signing key and also determines that a match exists between the wireless device credential's signing key and the access point credential's signing key. If the signature is validated and a match is verified, the wireless device may safely assume that the credential was issued by the configurator and that the access point is not masquerading.

The wireless device also verifies that the service identifier of the access point credential matches the at least one of the service identifiers of the wireless device credential.

In operation 712, the wireless device associates with the access point. In particular, the wireless device may send an association request frame to the access point. The association request frame should include the network identifier of the WLAN. The access point may reply with an association response frame containing a notification of acceptance of the request. The response may also include the BSSID of the WLAN. After the wireless device associates with the access point, the wireless device may transmit traffic to the WLAN using the BSSID.

Once the wireless device associates with the access point, a secure connection may be established there between using methods known in the art. In some embodiments, the authentication of the wireless device and the establishment of the secure connection are carried out using portions of the DPP protocol relating to Network Introduction Exchange and Network Access. In some embodiments, a secure connection is established through the Robust Security Network Association (RSNA) authentication algorithm described in the key management section of the IEEE 802.11 standard, also known as the four-way handshake.

In operation 714, the access point may obtain and apply a network policy associated with the wireless device. A network policy may refer to one or more criteria or rules that govern the communication of data once a network connection has been established between a wireless device and an access point. An example of a network policy may include a communication filtering policy, which specifies that a communication of information (including traffic data or control information) is subject to filtering according to one or more rules or criteria. For example, a communication filtering policy can specify that incoming traffic from a specific Internet Protocol (IP) address or range of IP addresses be blocked.

The network policy may restrict which computing devices the connected wireless device may communicate with. In one example, the policy may block communications between the wireless devices connected to the WLAN. In another example, the policy may restrict the wireless device from using Universal Plug and Play (UPNP) and multicast Domain Name System (mDNS).

In some embodiments, the policy may restrict the wireless device to communications with a particular remote computing device. For example, the policy may specify the configuration of a virtual private network (VPN) for securing communications between the connected wireless device and the remote computing device and for restricting communications to the wireless device from the wider Internet.

The network policy may be obtained using the provisioned policy identifier. In particular, the policy identifier may be a Uniform Resource Locator (URL) that corresponds to a policy file stored on the policy server. The access point may retrieve the policy file from the location specified by the URL. The policy file may define a network policy for the service provided through the wireless device. The policy file may be used to set network policy associated with the wireless device, for example, traffic filters, credential expiry, device isolation, and enabling IP multicast.

In some embodiments, a vendor of the wireless device or an IoT service provider may use the Manufacturer Usage Description (MUD) specification to specify the network behavior of the wireless device. In this example, the policy identifier may be a Manufacturer Usage Description (MUD) URL and the policy file may be a MUD file. The access point may use the MUD file to configure a firewall and enforce a policy onto the WLAN in the form of port-based access control lists for the wireless device's connection.

Wireless devices that connect to the WLAN using the same service identifier should be subject to the same network policy.

Once the network policy is obtained and applied to the WLAN by the access point, the wireless device may communicate with the remote computing device.

In some embodiments, the access point may receive and carry out instructions to change the value of the network identifier of the WLAN to another value. In this case, the wireless device may be reconnected to the WLAN by carrying out particular operations 706, 708, 710, 712 and 714 of the example method as described in FIG. 7.

It will be appreciated that some or all of the above-described operations of the various above-described example methods may be performed in response to other above-described operations.

It will be appreciated that it may be that some or all of the above-described operations of the various above-described example methods may be performed in orders other than those illustrated and/or may be performed concurrently without varying the overall operation of those methods.

Example embodiments of the present application are not limited to any particular operating system, system architecture, mobile device architecture, server architecture, or computer programming language.

It will be understood that the applications, modules, routines, processes, threads, or other software components implementing the described method/process may be realized using standard computer programming techniques and languages. The present application is not limited to particular processors, computer languages, computer programming conventions, data structures, or other such implementation details. Those skilled in the art will recognize that the described processes may be implemented as a part of computer-executable code stored in volatile or non-volatile memory, as part of an application-specific integrated chip (ASIC), etc.

Certain adaptations and modifications of the described embodiments can be made. Therefore, the above discussed embodiments are considered to be illustrative and not restrictive.

What is claimed is:

1. A computer-implemented method of connecting a wireless device to a wireless network, the method comprising:
   receiving, by an access point of the wireless network, configuration information including:
      a service identifier corresponding to a service provided through the wireless device, and
      a credential associated with the wireless device;
   advertising, by the access point to the wireless device, the service identifier in an unsigned format;
   receiving, by the access point from the wireless device, an association request including a network identifier corresponding to the wireless network and distinct from the service identifier; and authenticating, by the access point, the wireless device based on the service identifier and the credential,
wherein the service identifier is an attribute of the credential and the credential is digitally signed.

2. The method of claim 1, wherein the service identifier is an immutable identifier.

3. The method of claim 1, wherein the configuration information comprises a policy identifier corresponding to both the service identifier and a network policy to apply to a communication of the wireless device.

4. The method of claim 1, further comprising:
transmitting, by the access point to the wireless device, a wireless device credential useable by the wireless device to authenticate with the access point.

5. The method of claim 1, wherein advertising the service identifier comprises advertising the network identifier.

6. The method of claim 1, further comprising:
transmitting, by the access point to the wireless device prior to advertising the service identifier, the service identifier usable by the wireless device to match with the service identifier.

7. The method of claim 6, wherein transmitting the service identifier is performed as part of a device provisioning protocol and advertising the service identifier is performed as part of a pre-association discovery procedure.

8. A system comprising:
an access point comprising:
a processor; and
memory coupled to the processor of the access point and storing processor-readable instructions that, when executed, cause the processor of the access point to:
receive, by the access point, configuration information including:
a service identifier corresponding to a service provided through a wireless device, and
a credential associated with the wireless device;
advertise, by the access point to the wireless device, the service identifier in an unsigned format;
receive, by the access point from the wireless device, an association request including a network identifier corresponding to a wireless network associated with the access point and distinct from the service identifier; and
authenticate, by the access point, the wireless device based on the service identifier and the credential,
wherein the service identifier is an attribute of the credential and the credential is digitally signed.

9. The system of claim 8, wherein the service identifier is an immutable identifier.

10. The system of claim 8, wherein the configuration information comprises a policy identifier corresponding to both the service identifier and a network policy to apply to a communication of the wireless device.

11. The system of claim 8, wherein the instructions, when executed, further cause the processor to:
transmit, by the access point to the wireless device, a wireless device credential useable by the wireless device to authenticate with the access point.

12. The system of claim 11, wherein advertising the service identifier comprises advertising the network identifier.

13. The system of claim 8, wherein the instructions, when executed, further cause the processor to:
transmit, by the access point to the wireless device prior to advertising the service identifier, the service identifier usable by the wireless device to match with the service identifier.

14. A non-transitory computer-readable storage medium storing processor-executable instructions to connect a wireless device to a wireless network, wherein the processor-executable instructions, when executed by a processor of an access point of the wireless network, are to cause the processor to:
receive, by the access point, configuration information including:
a service identifier corresponding to a service provided through the wireless device, and
a credential associated with the wireless device;
advertise, by the access point to the wireless device, the service identifier in an unsigned format;
receive, by the access point from the wireless device, an association request including a network identifier corresponding to the wireless network and distinct from the service identifier; and
authenticate, by the access point, the wireless device based on the service identifier and the credential,
wherein the service identifier is an attribute of the credential and the credential is digitally signed.

15. A computer-implemented method of connecting a wireless device to a wireless network, the method comprising:
receiving, by an access point of the wireless network, configuration information including:
a service identifier corresponding to a service provided through the wireless device, and
a credential associated with the wireless device;
transmitting, by the access point to the wireless device prior to advertising the service identifier, the service identifier usable by the wireless device to match with the service identifier;
advertising, by the access point to the wireless device, the service identifier;
receiving, by the access point from the wireless device, an association request including a network identifier corresponding to the wireless network and distinct from the service identifier; and
authenticating, by the access point, the wireless device based on the service identifier and the credential.

16. The method of claim 15, wherein the service identifier is an attribute of the credential.

17. The method of claim 15, wherein the credential is digitally signed.

18. The method of claim 15, wherein advertising the service identifier comprises:
advertising the service identifier in an unsigned format.

19. The method of claim 15, wherein the service identifier is an immutable identifier.

20. The method of claim 15, wherein the configuration information comprises a policy identifier corresponding to both the service identifier and a network policy to apply to a communication of the wireless device.

21. The method of claim 15, further comprising:
transmitting, by the access point to the wireless device, a wireless device credential useable by the wireless device to authenticate with the access point.

22. The method of claim 15, wherein advertising the service identifier comprises advertising the network identifier.

23. The method of claim 15, wherein transmitting the service identifier is performed as part of a device provisioning protocol and advertising the service identifier is performed as part of a pre-association discovery procedure.

24. A system comprising:
an access point comprising:
a processor; and
memory coupled to the processor of the access point and storing processor-readable instructions that, when executed, cause the processor of the access point to:
receive, by the access point, configuration information including:
a service identifier corresponding to a service provided through a wireless device, and
a credential associated with the wireless device;
transmit, by the access point to the wireless device prior to advertising the service identifier, the service identifier usable by the wireless device to match with the service identifier;
advertise, by the access point to the wireless device, the service identifier;
receive, by the access point from the wireless device, an association request including a network identifier corresponding to a wireless network associated with the access point and distinct from the service identifier; and
authenticate, by the access point, the wireless device based on the service identifier and the credential.

25. The system of claim 24, wherein the service identifier is an attribute of the credential.

26. The system of claim 24, wherein the credential is digitally signed.

27. The system of claim 24, wherein advertising the service identifier comprises:
advertising the service identifier in an unsigned format.

28. The system of claim 24, wherein the service identifier is an immutable identifier.

29. The system of claim 24, wherein the configuration information comprises a policy identifier corresponding to both the service identifier and a network policy to apply to a communication of the wireless device.

30. The system of claim 24, wherein the instructions, when executed, further cause the processor to:
transmit, by the access point to the wireless device, a wireless device credential useable by the wireless device to authenticate with the access point.

31. The system of claim 24, wherein advertising the service identifier comprises advertising the network identifier.

32. A non-transitory computer-readable storage medium storing processor-executable instructions to connect a wireless device to a wireless network, wherein the processor-executable instructions, when executed by a processor of an access point of the wireless network, are to cause the processor to:
receive, by the access point, configuration information including:
a service identifier corresponding to a service provided through the wireless device, and
a credential associated with the wireless device;
transmit, by the access point to the wireless device prior to advertising the service identifier, the service identifier usable by the wireless device to match with the service identifier;
advertise, by the access point to the wireless device, the service identifier;
receive, by the access point from the wireless device, an association request including a network identifier corresponding to the wireless network and distinct from the service identifier; and
authenticate, by the access point, the wireless device based on the service identifier and the credential.

* * * * *